United States Patent [19]

Schmidt

[11] 4,163,499

[45] Aug. 7, 1979

[54] CASSETTE UNLOADER

[75] Inventor: Gunter Schmidt, Malibu, Calif.

[73] Assignee: E. I. Du Pont de Nemours and Company, Wilmington, Del.

[21] Appl. No.: 805,816

[22] Filed: Jun. 13, 1977

[51] Int. Cl.² ............................................. B65G 65/04
[52] U.S. Cl. ................................................... 414/411
[58] Field of Search ........................ 214/304; 250/468

[56] References Cited

U.S. PATENT DOCUMENTS

| 3,105,903 | 10/1963 | Sano et al. | 250/468 |
| 3,891,854 | 6/1975 | Hura | 214/304 |
| 3,964,107 | 6/1976 | Stievenart et al. | 250/468 |

Primary Examiner—Lawrence J. Oresky

[57] ABSTRACT

Apparatus for opening a cassette, of the type which carries a sheet of X-ray film, to allow the film to move into processing equipment, without requiring a darkroom. The apparatus includes a lighttight housing containing inclined guides for receiving the cassette, and pins at the bottom of the space between the guides, that can engage latches on the cassette to open it. The cassette is forced against the pins by a cover on the housing, which pushes on the cassette as the cover approaches its fully closed position, so the pins unlatch the cassette which opens to allow the film sheet to drop out.

7 Claims, 7 Drawing Figures

U.S. Patent  Aug. 7, 1979  Sheet 1 of 2  4,163,499
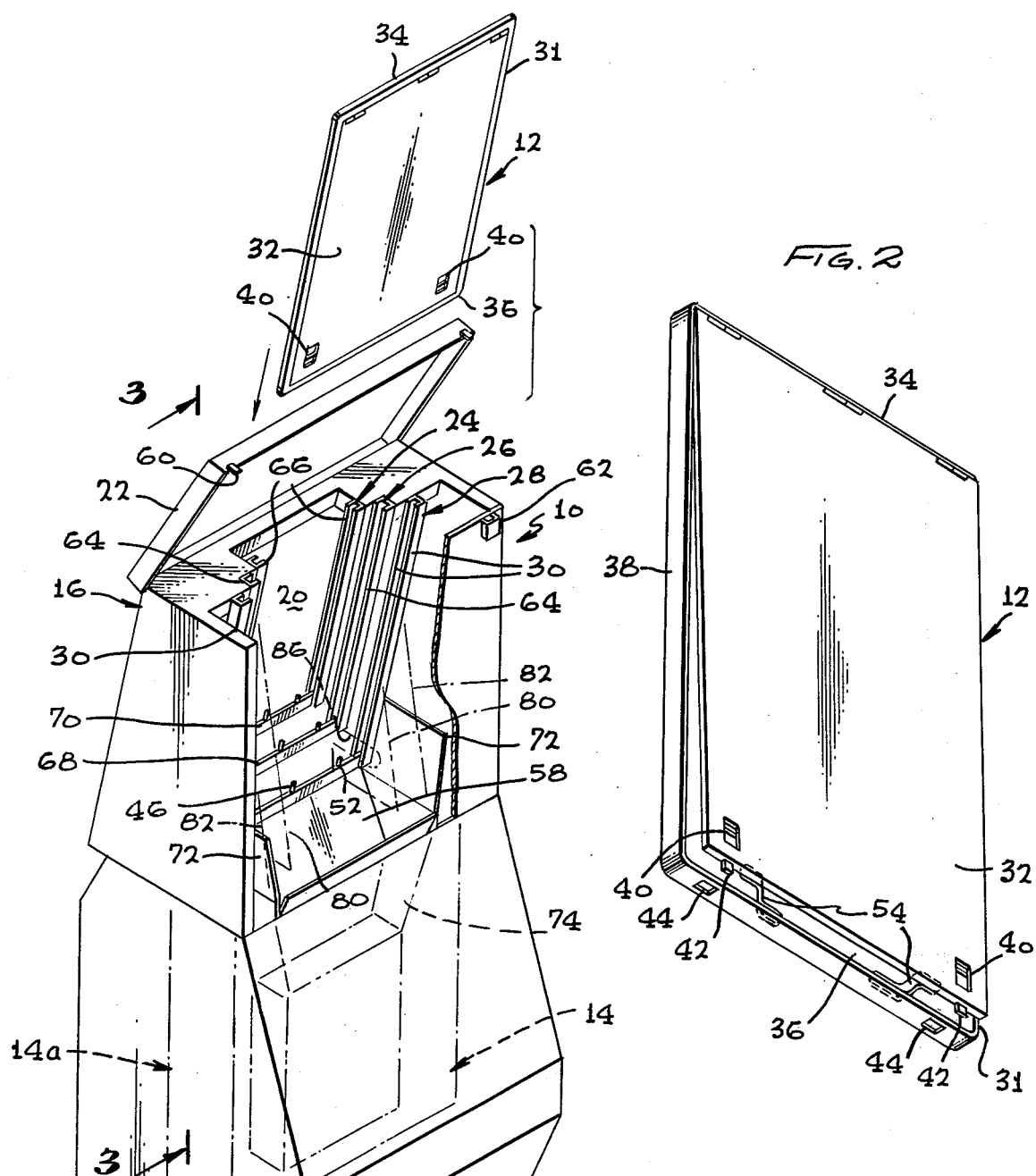
FIG. 1
FIG. 2
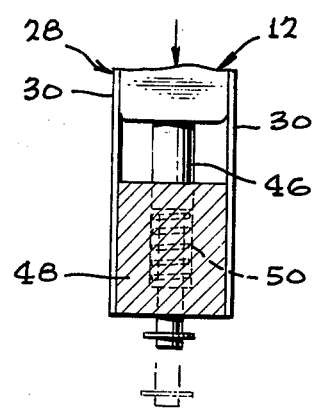
FIG. 7

CASSETTE UNLOADER

BACKGROUND OF THE INVENTION

This invention relates to apparatus for unloading cassettes of the type that contain X-ray film.

One type of cassette commonly used to hold a large sheet of X-ray film for recording a chest X-ray image or the like, includes a pair of walls pivotally connected at one end and latchable at the opposite end, which hold a film sheet between them. Such cassettes permit an undeveloped film sheet to be handled in a daylight environment, as when bringing the film to a chest X-ray unit for exposure or when carrying the exposed film to a processor.

Although the use of a cassette has facilitated movement of the undeveloped film, it has usually been necessary to bring the cassette to a darkroom for removal of the film and placement of it in a processing machine which develops it. It would be possible to devise complex unloader mechanisms for opening the cassette and transferring the film to a processor while an operator of the mechanism stands in a daylight environment. However, in order for a film unloader to gain wide acceptance, it is necessary that it be relatively simple, to minimize the cost and maximize the reliability of the device. It would also be desirable if any such unloader could accept cassettes of a plurality of different sizes without requiring it to have a substantially increased size or complexity.

SUMMARY OF THE INVENTION

In accordance with one embodiment of the present invention, an unloader is provided for an X-ray film-holding cassette, which can open the cassette to allow the film to fall into processing apparatus, utilizing a relatively simple and reliable mechanism. The unloader includes a light-tight housing with guides that slidably receive a cassette, and with release pins at the end of the space between the guides for engaging corresponding latches on the cassette to open it. The guides extend at an incline from the vertical, so that the cassette tends to swing widely open when unlatched, and the film will then drop out.

The housing includes an upper opening, through which the cassette is received, and a cover that can be pivoted closed over the opening. A spring biased retainer member holds the cassette slightly above the pins, to prevent opening of the cassette while the cover is open. As the cover is swung closed, it pushes down against the cassette to engage the pins, so that the cassette opens only when the housing is substantially sealed from light in the environment. A plurality of guides are provided for receiving cassettes of different sizes. The pins at the ends of the different guides are positioned so that the upper end of the cassette lies slightly above the door level when the bottom of the cassette is close to the pins, so that closing of the door will push down and cause unlatching of the cassette held by any of the guides.

BRIEF DESCRIPTION OF THE DRAWINGS

FIG. 1 is a perspective view of an unloader constructed in accordance with the present invention, and of a cassette which fits therein, with a portion of the unloader housing being cut away.

FIG. 2 is a perspective view of the cassette of FIG. 1, showing the latchable ends of the cassette in a slightly opened condition.

FIG. 7 is a view taken on line 7—7 in FIG. 5.

DESCRIPTION OF THE PREFERRED EMBODIMENTS

Figure 3:
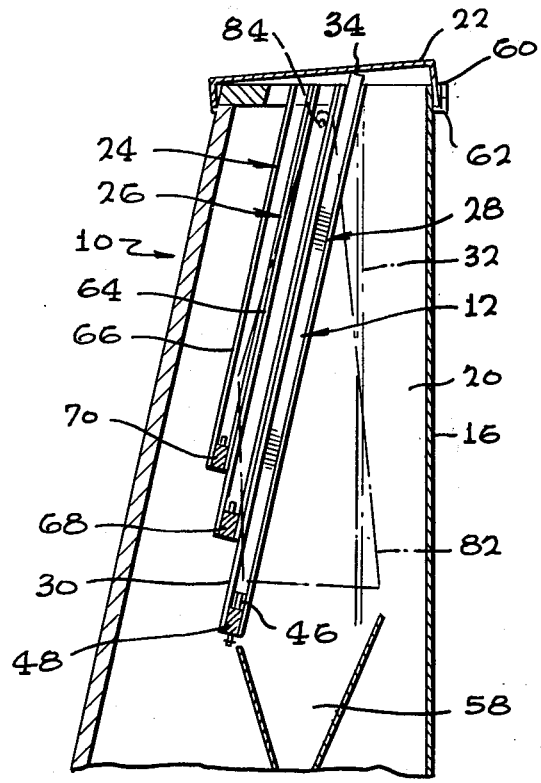
FIG. 3 is a partial sectional view taken on the line 3—3 of FIG. 1, but with the cover in an almost closed condition.

FIG. 1 illustrates a cassette unloader 10 which can receive a cassette 12, wherein the cassette is closed and contains a sheet of exposed X-ray film. The unloader can open it while holding the cassette at an incline from the vertical, to allow the film therein to fall out, and can funnel the film to a processing apparatus 14, all without exposing the film to light in spite of the unloader lying in a daylight environment.

The unloader 10 includes a lighttight housing 16 with a bottom that rests on apparatus 14 and a top forming an opening 20 through which cassettes are received. After a cassette has been received, a cover 22 can be closed to make the housing lighttight. A group of guide assemblies 24, 26 and 28 are provided for receiving cassettes of different sizes. The particular cassette 12 is designed to be received between a pair of guides 30 of the guide assembly 28.

The cassette 12 includes a pair of walls 31, 32 that are pivotally joined at one end 34 of the cassette and which are latched together at an opposite end 36 of the cassette. As shown in greater detail in FIG. 2, the base wall 31 includes a periphery 38 that surrounds the covering wall 32 when the cassette is closed. The covering wall 32 includes a pair of latches 40 that are spring biased so that their ends 42 tend to project from the wall and through corresponding holes 44 in the periphery 38 of the base wall, when the cassette is closed. The latches 40 can, however, be retracted to withdraw their ends 42, for opening or closing of the cassette. The unloader 10 is constructed to automatically operate the latches to open the cassette after it is inserted in the unloader.

Figure 4:
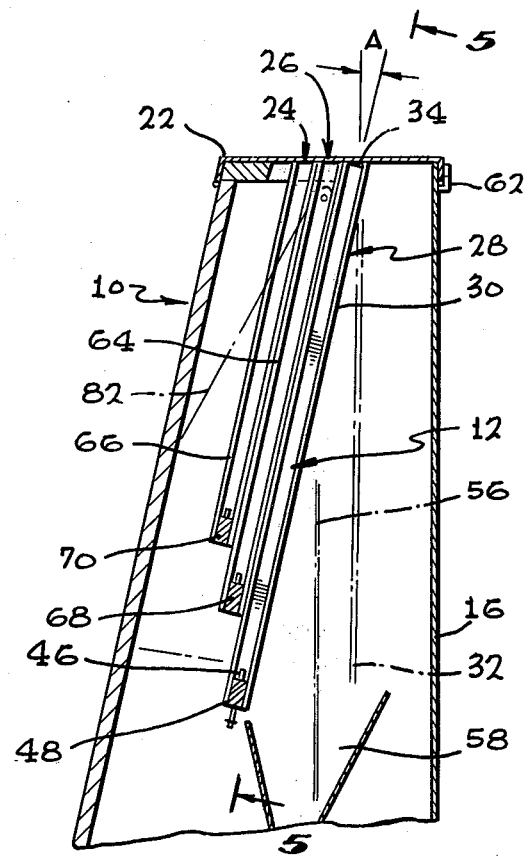
FIG. 4 is a view similar to FIG. 3, but showing the cover fully closed and the cassette opened.
Figure 5:
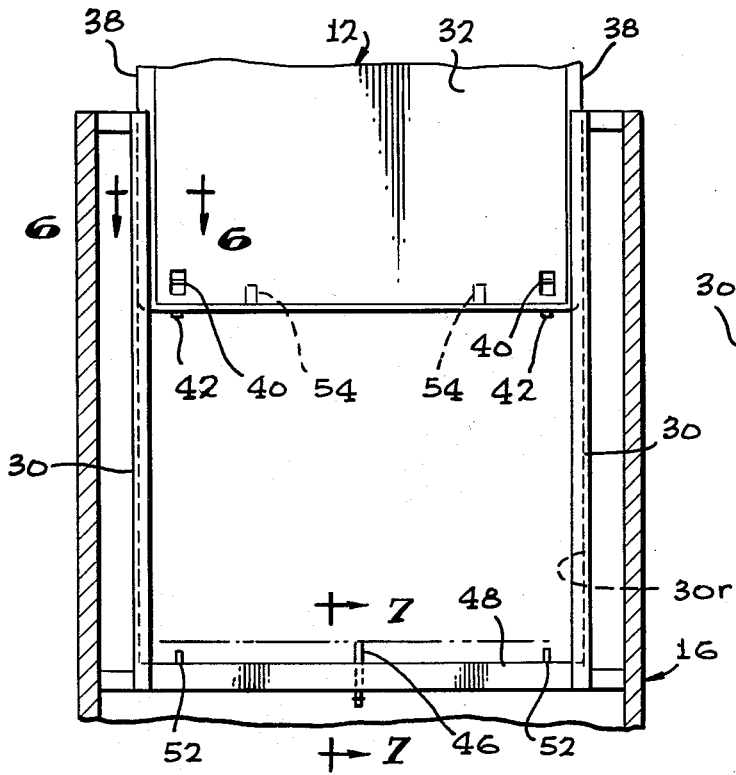
FIG. 5 is a partial view taken on the line 5—5 of FIG. 4, but showing the cassette partially inserted in the unloader.

When the cassette 12 is inserted between the guides 30, as indicated in FIGS. 3-5, the cassette moves down until it encounters a spring-loaded retainer 46 which lies on a bar 48 at the lower end of the space between the guides 30. When downward force is applied to the cassette, it presses down the retainer 46 against the force of a spring 50 (FIG. 7), so that the cassette can approach and engage a pair of release members or pins 52.

The pins 52 are located so that they will fit into the holes 44 (FIG. 2) of the cartridge to push against the ends 42 of the cassette latches. Thus, as the cassette is forced down, the pins 52 force the retraction of the latches to release the latchable ends of the cassette walls, so that the walls can move apart. A pair of leaf springs 54 are located within the cassette to initially push apart the walls to begin the opening of the cassette. The leaf springs 54 also lie behind the lower edge of the film, so they push out the lower film edge as the cassette opens.

Figure 6:
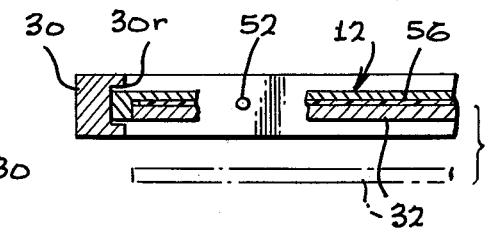
FIG. 6 is a view taken on the line 6—6 of FIG. 5.

As shown in FIG. 4, the guides 30 are inclined by an acute angle A from the vertical. As a result, when the cassette latches are released and the cover wall 32 of the cassette moves slightly open, gravity pulls the cover wall 32 to a more open position. With the cassette considerably opened and oriented at an incline so the film 56 faces partially downward, the film 56 (whose lower edge is pushed out by the leaf springs in the cassette) is able to fall out of the cassette and into a processor apparatus located below a funnel 58. It may be noted that the cassette must be inserted so that the cover wall 32 faces downwardly. As shown in FIGS. 5 and 6, the guides 30 have shallow recesses 30r so that they hold only the periphery 38 of the base wall of the cassette, but not the cover wall 32. Thus, the cover wall 32 is free to swing open when unlatched.

When the cassette is initially inserted through the opening 20 at the top of the unloader housing, the cassette is exposed to light entering through the opening 20. It is important that the cover 22 be closed sufficiently to keep out light, at the time when the cassette is unlatched to open, and it is desirable that the cassette then opens automatically. To accomplish this, the cover 22 is utilized in the manner illustrated in FIGS. 3 and 4, to push down the cassette, and to open it immediately after the cover is moved to a position wherein it closes sufficiently to keep out light. As discussed above, the inserted cassette initially rests on the retainer 46, to prevent premature opening of the cassette. When the cassette rests on the retainer 46, as in FIG. 3, the upper end 34 of the cassette projects into the path of the cover 22. With the door 22 lying lightly on the upper end of the cassette, it is sufficiently closed to prevent the entrance of light into the unloader, but the opening 20 is not yet fully closed. The technician can fully close the opening by applying downward force to the cover, until holder members 60 on the cover engage catches 62 on the side walls of the housing to keep the cover fully closed. While the cover is being fully closed, it pushes down the cassette 12 against the biasing of retainer 46, until the cassette latches engage the pins 52 at the bottom of the space between the guides 30. The pins 52 then depress the latch ends of the cassette, to cause opening of the cassette and falling out of the X-ray film.

As mentioned above, the unloader includes two guide assemblies 24, 26 (FIG. 1), in addition to the guide assembly 28 with guides 30, to enable the unloading of two other sizes of cassettes. The other two cassette sizes are of smaller length and narrower width than the cassette 12. Accordingly, the pairs of guides 64 and 66 of each of the other guide assemblies are closer together, and the lower bars 68, 70 are at a greater height than the lower bar 48 which holds the retainer 46 and the pins 52. The other bars 68, 70 hold corresponding pins and retainers, at levels such that when cassettes of corresponding sizes are first installed, and lie on their respective spring-biased retainers, their upper ends lie in the path of the cover 22. Accordingly, full closure of the cover will push down and cause opening of cassettes of any of the three sizes provided for. The funnel 58 is made wide enough to receive films dropping from any of the three guide assemblies. It also may be noted that side funnel plates 72 are provided to engage the sides of films to enable their passage through the funnel 58, and that a processor apparatus such as 14a, designed to receive a small film sheet from a small cassette, may be provided with additional side funnel plates 74 to accurately guide these small sheets into the corresponding processor apparatus.

As mentioned above, side funnel plates 72 (FIG. 1) can engage the sides of films dropping towards the funnel 58. These plates prevent tumbling of large films exiting from large cassettes on the guide assembly 28. In order to prevent tumbling of films exiting from smaller cassettes on the guide assemblies 24, 26, two pairs of edge guides 80, 82 are provided. The pair of edge guides 82 are pivotally mounted on the outside of grooved guides 64 of the guide assembly 26. These edge guides can guide the edges of a film exiting from a cassette on the guides 64.

In order to allow the edge guides 82 to effectively guide a film, the edge guides 82 must extend through the space between the cassette guides 30, as shown in FIG. 3. The edge guides 82 tend to assume this position when free to pivot thereto by gravity. When a large cassette 12 is received between the guides 30, as shown in FIG. 4, the large cassette will deflect the edge guides 82 out of the way of the cassette, and out of the way of a film 56 falling from the cassette. In a similar manner the edge guides 80 (FIG. 1) lying beside the smallest guide assembly 24, will be deflected by a medium cassette on guide assembly 26, and will be partially deflected by a large cassette on guide assembly 26. It may be noted that the edge guides 80 have slots 86 to avoid engagement with bar 68 on the guide assembly 26.

Thus, the invention provides a relatively simple apparatus for removing a sheet of X-ray film from a cassette by an operator located in a daylight environment. This is accomplished by utilizing a lighttight housing with guide means for receiving the cassette in the housing and with pins, or release members, positioned in the housing to engage the latches on the cassette to release them when the cassette has been inserted into the housing. Closing of the housing to make it lighttight, and also to aid in pushing in the cassette against the release pins, is enabled by the use of a cover. The cover moves close enough to its fully closed position to keep the housing lighttight at a time when it pushes the cassette against the release pins, so that the cassette opens in a dark environment. A biased retainer holds the cassette from fully engaging the pins until pushed down by the cover. The guides hold the cover at an incline, so that once it is unlatched it swings open to allow the film to drop out therefrom and into a funnel leading to processing apparatus. A series of closely spaced guides can be utilized to hold cassettes of a plurality of different sizes in a compact unloader. The guides can be positioned so that each cassete size is pushed against its respective release pin by the cover approaching its fully closed position. Film edge guides can be provided that guide the exiting film through the space at which larger cassettes can be received, and with the edge guides being deflectable out of the way by the larger cassettes.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An unloader for an X-ray film-holding cassette which has a pair of walls pivotally joined at one end and held together at the other end by at least one latch which can be pushed in to release the walls so they can pivot apart, said unloader comprising:

a lighttight housing;

guide means for slidably receiving one wall of said cassette in said housing and holding it inclined at an acute angle to the vertical;

a release member fixedly positioned in said housing to engage the latch on a cassette received by said guide means, whereby to release the other wall for swinging movement to an open position; and a retainer in the path of a cassette received by said guide means biased to hold said cassette out of engagement with said release member until said cassette is pushed against the bias of said retainer, and, means to move said cassette against said retainer.

2. The unloader described in claim 1 wherein:

said means to move said cassette against said retainer is a cover on said housing;

said guide means slidably holds said cassette in movement toward and away from said release member;

said cover and release member are positioned so that when the release member initially engages said cassette said cover is not completely closed but can lie against the hinged end of the cassette, and as the cover approaches a fully closed position it pushes the cassette latch against said release member.

3. The unloader described in claim 2 wherein:

said guide means includes a pair of guides forming a first pair of spaced grooves for slidably holding said cassette; and including a second pair of guides forming a second pair of grooves spaced apart by a distance less than the spacing of said first grooves and extending substantially parallel thereto to hold a small cassette which is shorter and narrower than a cassette designed to fit between said first pair of guides but which has a similar latch;

said release member lies at an end of the space between said first guides; and including a second release member lying at an end of the space between said second pair of guides and at a distance from said cover so that as said cover approaches a fully closed position it pushes the latch of a small cartridge against said second release member.

4. The unloader described in claim 1 wherein:

said guide means includes a pair of guides forming a first pair of spaced grooves for slidably holding said cassette; and including second guide means including a second pair of guides forming a second pair of grooves spaced apart by a distance less than the spacing of said first groove and extending substantially parallel thereto to hold a smaller cassette which is shorter and narrower than a cassette designed to fit between said first pair of guides;

means defining a film-receiving region under said first and second guide means, for receiving a film falling out of a cassette on said first or second guides; and a pair of film edge guides lying at either side of said second guides to guide a film from a second cassette to said film-receiving region, said edge guides having portions movable between first positions wherein they lie between said first guides and second positions wherein said portions lie out of a position between said first guides.

5. An unloader for an X-ray film holding cassette which has a first wall and a second wall narrower than said first wall, said walls pivotally joined at one end and held together at the other end by a pair of latches which can be moved to release the walls so they can pivot apart, said unloader comprising:

a pair of parallel guides spaced apart to slidably receive said cassette between them, said guides oriented at an incline from the vertical so that the cassette can be installed thereon with said second wall facing downwardly, and said guides holding only said first wall of said cassette so that the second wall is free to swing open when unlatched;

a pair of fixed release pins for engaging the latches on a cassette held by said guides, whereby to unlatch the cassette;

a retainer biased to a position in the path of a cassette received by said guides to hold said cassette out of unlatching engagement with said release pins to prevent premature unlatching of said latches; and means for pushing said cassette toward said release pins with a force which overcomes the bias on said retainer.

6. The unloader described in claim 5 including:

a lighttight housing surrounding said guides, said housing having an opening providing access to said guides, and said housing having a cover for closing said opening, said cover forming said pushing means.

7. The unloader described in claim 5 including:

a second pair of parallel guides spaced apart by less than said first-named pair of guides to receive a narrower cassette, said second guides inclined substantially parallel to said first pair of guides and lying above said first piar of guides, funnel means positioned below said first and second parallel guides, for receiving films from cassettes on said first and second guides; and a pair of edge guides pivotally mounted at either side of said second guides, to guide the edges of a film leaving a cassette on said second guides toward said funnel means, said edge guides having portions which normally lie in the path of a cassette on said first parallel guides and which are moved out of the space between said first parallel guides by a cassette moved therealong into said housing.

* * * * *